(12) United States Patent
Desard

(10) Patent No.: US 6,368,013 B1
(45) Date of Patent: Apr. 9, 2002

(54) JOINT TO BE ARRANGED AROUND THE CIRCUMFERENCE OF A GLOBALLY CYLINDRICAL ELEMENT

(75) Inventor: Christophe Desard, Herbignac (FR)

(73) Assignee: Pouyet, S.A. (FR)

( * ) Notice: Subject to any disclaimer, the term of this patent is extended or adjusted under 35 U.S.C. 154(b) by 0 days.

(21) Appl. No.: 09/331,633

(22) PCT Filed: Dec. 15, 1997

(86) PCT No.: PCT/FR97/02295

§ 371 Date: Jun. 22, 1999

§ 102(e) Date: Jun. 22, 1999

(87) PCT Pub. No.: WO98/28558

PCT Pub. Date: Jul. 2, 1998

(30) Foreign Application Priority Data

Dec. 15, 1997 (FR) .............................. 96-15831

(51) Int. Cl.[7] .............................. F16L 5/02; B25G 3/36; F16J 15/02
(52) U.S. Cl. .................. 403/393; 403/339; 403/340; 277/631
(58) Field of Search .................. 403/339, 340, 403/341, 401, 402, 293, 298; 277/631, 199, 192

(56) References Cited

U.S. PATENT DOCUMENTS

| 210,848 | A | * | 12/1878 | Ginigras ................. 403/375 X |
|---|---|---|---|---|
| 581,917 | A | * | 5/1897 | Munz ......................... 403/339 |
| 599,717 | A | * | 3/1898 | Maddux ................. 403/339 X |
| 1,130,610 | A | * | 3/1915 | Kane ......................... 403/339 |
| 1,296,401 | A | * | 3/1919 | Jones et al. ............. 403/339 X |
| 2,229,279 | A | * | 1/1941 | Cranston, Jr. et al. ...... 403/339 |
| 2,465,783 | A | * | 3/1949 | Beaty ..................... 403/381 X |
| 3,253,842 | A | * | 5/1966 | Rabe ..................... 403/364 X |
| 3,738,670 | A | * | 6/1973 | Jelinek et al. .............. 277/199 |
| 3,955,895 | A | * | 5/1976 | Raimbault .................. 403/340 |
| 5,149,108 | A | * | 9/1992 | Leiszter .................. 403/364 X |
| 5,161,808 | A | * | 11/1992 | Walters .................. 403/295 X |
| 5,419,657 | A | * | 5/1995 | Davis .................... 403/340 X |

FOREIGN PATENT DOCUMENTS

| DE | 1559730 | * 10/1969 | ................. 403/340 |
|---|---|---|---|
| EP | 695900 | * 6/1996 | |

OTHER PUBLICATIONS

The Carpenters and Joiners Assistant, "Joints in Joinery", Newlouds, 1860.*

Derwet Abstracts, Sealed Passage for Telecommunication Cables, translation of patent EP695900 A1.*

* cited by examiner

Primary Examiner—Lynne H. Browne
Assistant Examiner—Ernesto Garcia
(74) Attorney, Agent, or Firm—Richard P. Gilly

(57) ABSTRACT

The invention concerns a joint, the ends of which (330) comprise means (333) which can be removably fitted into one another so that they can be mutually attached to or detached.

12 Claims, 4 Drawing Sheets

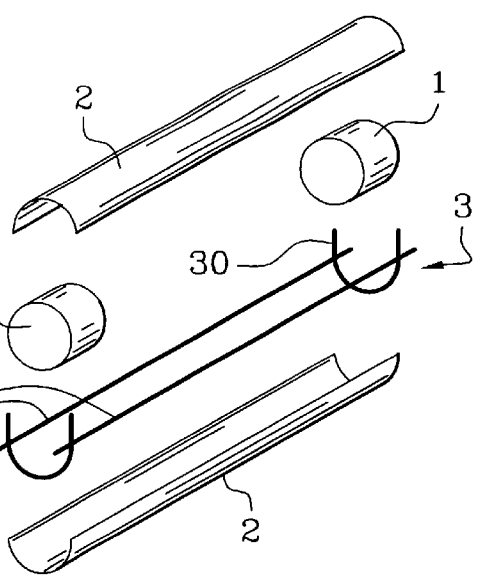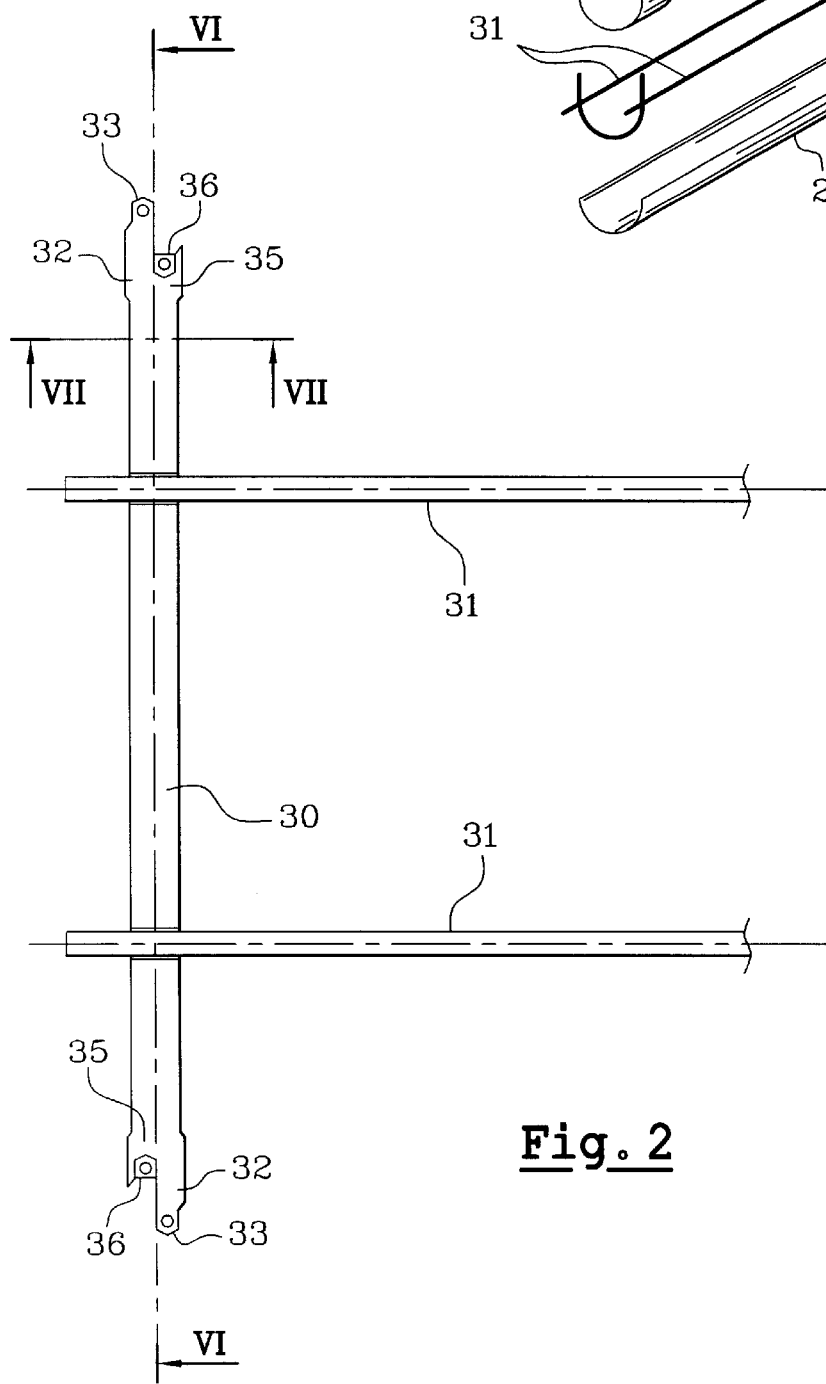

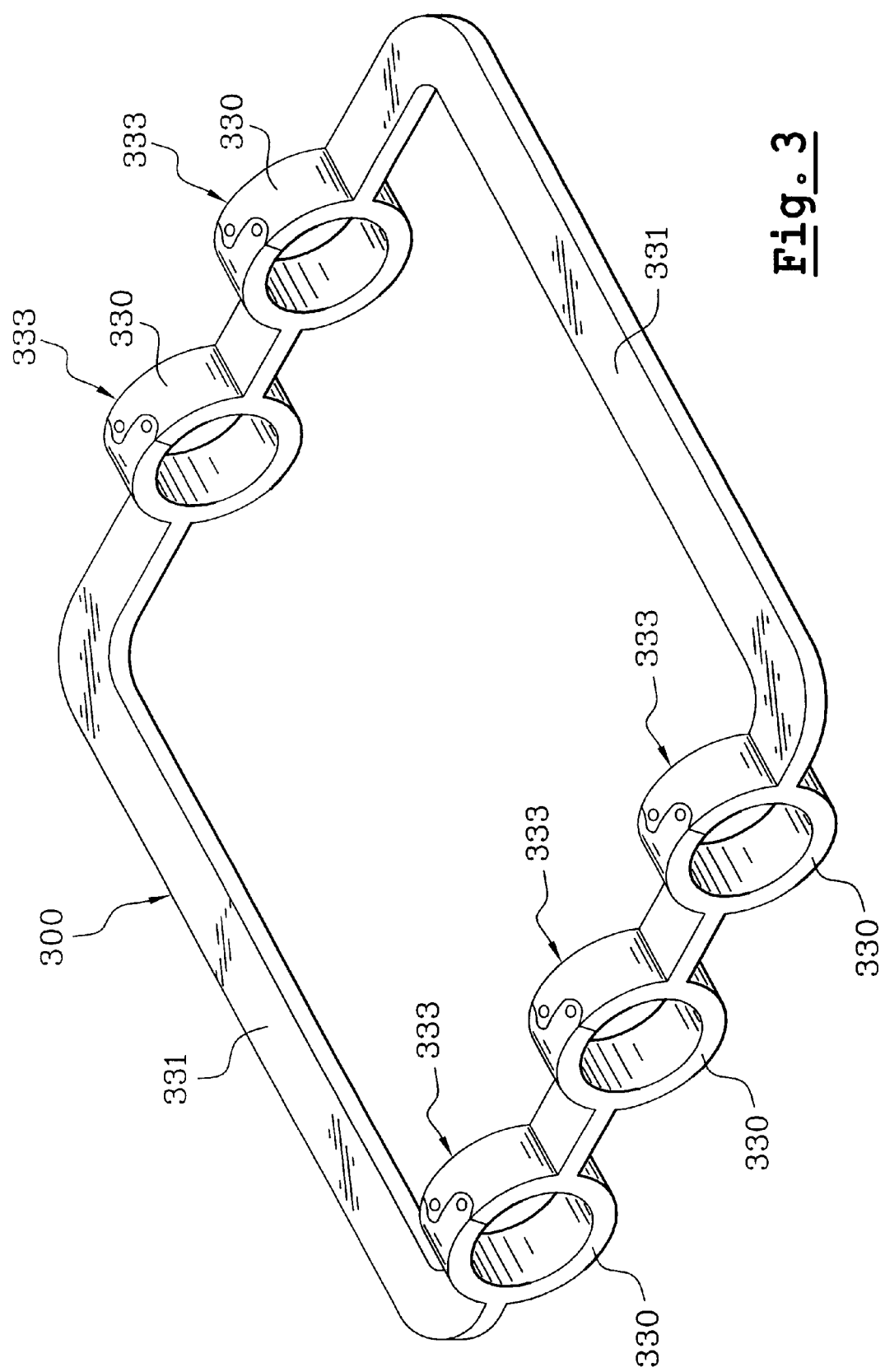

JOINT TO BE ARRANGED AROUND THE CIRCUMFERENCE OF A GLOBALLY CYLINDRICAL ELEMENT

The present invention generally relates to a sealing joint, and more particularly to a joint intended for effecting seal around a globally cylindrical element passing through an opening made in two elements positioned one on the other to form a closed envelope, or in a single element formed so as to be able to open elastically along an edge in order to release the globally cylindrical element.

Such sealing joints are located around cables entering or emerging from a connection box. They pass through orifices formed partly in the bottom of the box and partly in the lid thereof Such joints are also used around discs of protecting sleeves employed for insulating from the environment the connected ends of cables, for example cables of a communication network. These sleeves usually comprise two discs disposed around the incoming cables and the outgoing cables and a globally cylindrical envelope positioned around said discs in order tightly to seal the space included between these discs in which the connection of the cables is effected. The envelope may be made in one longitudinally slit piece, which is sufficiently elastic to be able to widen the slit in order to position the envelope around the discs or to withdraw it. The envelope may also be made in two parts positioned on either side of the discs.

The connection boxes and the protection sleeves, as well as the other devices of similar configuration must sometimes be open in order to modify the connections that they contain. During these interventions, it is often necessary to be able to remove the cables, the discs, or any other element circumferentially surrounded by a sealing joint.

The joints usually employed are continuous, which does not make it possible to intervene on the element that they surround without cutting them.

The intervening personnel must then cut the joint as cleanly as possible then adhere the ends of the joint end to end after the intervention.

These operations, which are always delicate to effect even in the favourable environment of a workshop, are difficult to carry out successfully when they must be effected at the top of a pole or in a gallery.

Flat joints have also been proposed, for example in DE 27 42 760 and in FR 2 399 752, whose ends must be adhered on one another during assembly. During an intervention, it is necessary either to unstick the ends or cut the joint at another point.

Documents EP-A-0 695 900, FR-A-2 572 156 and U.S. Pat. No. 5,149,108 may also be cited as state of the art, which show that a joint is known, intended to be wound circumferentially around a substantially cylindrical element, the ends of said joint along the longitudinal axis of the joint comprising means adapted to be removably fitted in one another in order to be mutually attached or detached.

The present invention tends to solve this problem by proposing a joint intended to be wound circumferentially around a substantially cylindrical element, the ends of said joint along the longitudinal axis of the joint comprising means adapted to be removably fitted in one another in order to be mutually attached or detached, characterized in that the fittable means comprise, at each longitudinal end of the joint, a projecting tongue and a short tongue located side by side and on either side of the longitudinal axis, the projecting tongue being longer, longitudinally, than the short tongue, in that the projecting tongues, and consequently the short tongues, of the two longitudinal ends of the joint are arranged on either Amended sheet side of the longitudinal axis so that the projecting tongue of one end fits with the short tongue of the other end when the joint is wound on the substantially cylindrical element, and in that the projecting and short tongues bear means allowing attachment and detachment thereof.

The joint according to the invention is also noteworthy in that:

the projecting tongue terminates in a tip less wide and less thick than it,

The projecting tongue terminates in a tip less wide and less thick than the projecting tongue itself.

the tip is traversed by an orifice, the tip is disposed in line with the upper surface of the joint, said short tongue presents a recess of the same shape and same thickness as the tip, a stud with the same diameter as the orifice of the tip is formed in the recess, the tip and the recess are respectively connected to the lateral edges of the joint by inclined faces, the ends present an assembly of concave and convex cut-outs made symmetrically so as to be able to be positioned in one another during closure of the joint, each of the ends of the joint presents recesses turned towards the upper face or towards the lower face of the joint, the recesses turned towards the lower face of the joint are formed in projecting tongues, the recesses turned towards the upper face of the joint bear studs while the wall of the recesses turned towards the lower face of the joint is traversed by an orifice.

The invention will be more readily understood thanks to the following description given by way of non-limiting example with reference to the accompanying drawings, in which:

FIG. 1 is an exploded view of a protective sleeve.

FIG. 2 is a partial plan view of a joint for sleeve implementing the invention.

FIG. 3 shows a joint according to the invention adapted to be used in a connection box.

Figure 8A:
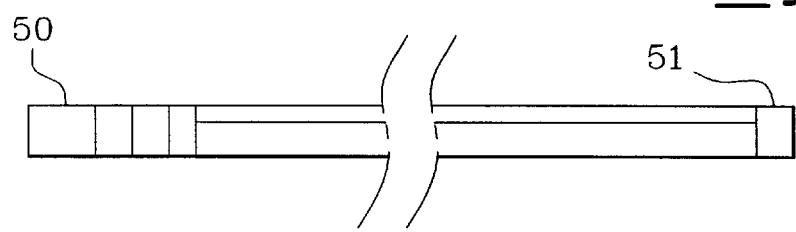
Figure 9A:
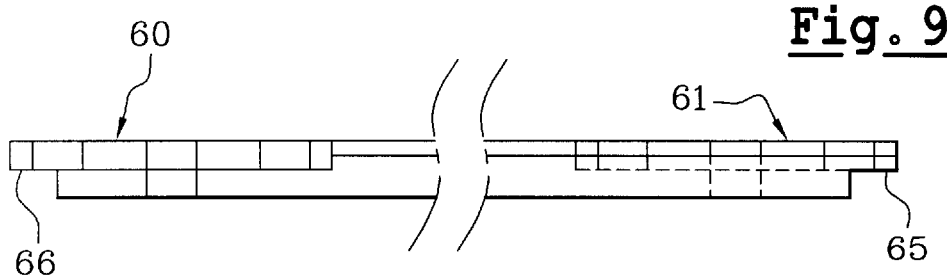

FIGS. 8*a* and 9*a* are side views of the two variant embodiments of a joint according to the invention.

Figure 8B:
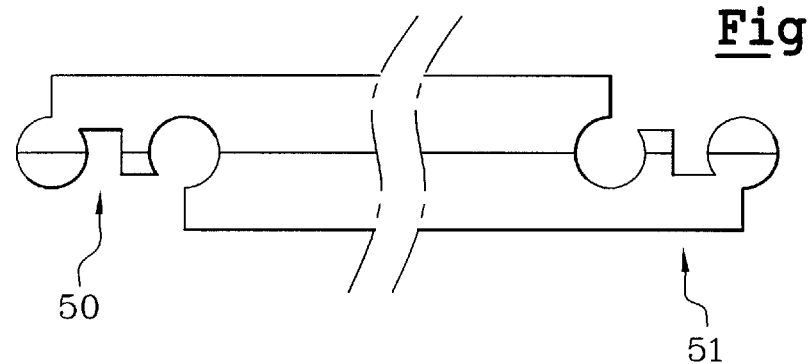
Figure 9B:
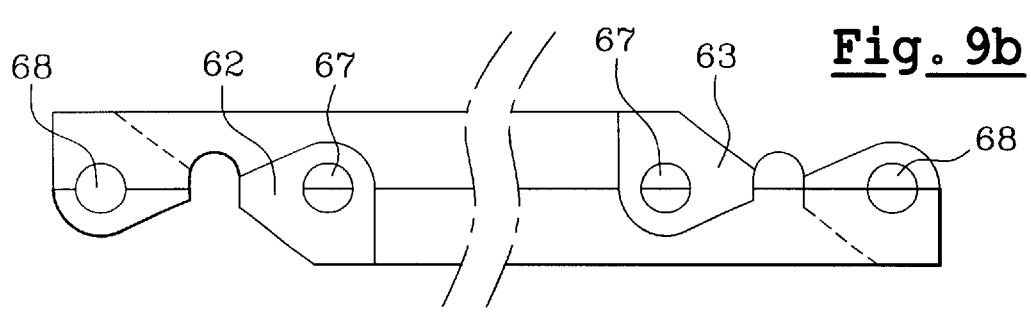

FIGS. 8*b* and 9*b* are plan views of the joints shown in FIGS. 8*a* and 9*a*.

FIG. 1 schematically shows a protection sleeve used for protecting connections made between cables.

Such sleeves comprise cylindrical discs 1 usually designed in at least two parts in order to be respectively disposed around the cables disposed upstream and the cables disposed downstream. These discs 1 are enclosed in an envelope shown in two parts 2 in the drawing. The envelope is closed tightly in order to protect the splicings made between the cables from outside aggressions.

The seal between the two parts 2 of the envelope and between each of the parts of the envelope and a disc 1 may be effected with the aid of a joint 3 comprising two rectilinear joints 31 intended to be positioned along the longitudinal openings of the envelope parts and two circumferential joints 30 intended to be positioned around the discs 1.

FIG. 2 shows the joint 3 of FIG. 1 disposed flat, according to the invention, the ends of the circumferential joints 30 are shaped so as to be able to be mutually attached or detached.

FIG. 3 shows a joint 300 intended to effect seal of a connection box (not shown). This joint 300 is composed of two portions 331 intended to be positioned between a lid and a bottom of the connection box and portions 330 intended to be positioned around the cables entering (or emerging from) the box, between said cables and the portions of orifices created in the box lid and bottom in order to ensure seal of the passages of cables.

According to the invention, the ends of the joint 30 of FIG. 2 and the portions 330 of FIG. 3 comprise means 32, 36 and 333 adapted to be removably fitted in one another In the embodiment of FIGS. 2 to 7, the ends of the joint are cut out along the longitudinal axis XX of the joint so as to form a projecting tongue 32, the projecting tongues 32 of the two ends of the joint 30 being disposed on either side of said longitudinal axis XX.

The joint 30 thus presents the appearance of two joints disposed one against the other along the longitudinal axis XX while being longitudinally offset.

The projecting tongue 32 terminates, in the example shown in the drawing, in a tip 33 less wide and less thick than said projecting tongue 32 and is traversed by an orifice 34. The tip 33 is disposed in line with the upper surface of the joint. For reasons which will be more readily understood hereinbelow, the lower end of the orifice 34 is bevelled.

The joint 30 comprises a short tongue 35 disposed aside each projecting tongue 32. The short tongue 35 presents a recess 36 of the same shape and same thickness as the tip 33 in which is formed a stud 37 presenting the same diameter as the orifice 34.

The tip 33 and the recess 36 are respectively connected to the lateral edges of the joint 30 by inclined faces 38 and 39.

When the circumferential joint 30 is being positioned around a disc, its running part is disposed in the groove borne to that end by the peripheral wall of the disc, or of the cable passage of the connection box, then each of the tips 33 of the projecting tongues 32 is disposed above the recess 36 of the short tongue 35 which is opposite thereto. The studs 37 are introduced in the orifices 34 so as to maintain the two ends of the joint attached to each other. Insertion of said studs 37 is facilitated by the presence of bevels at the lower end of the orifices 34.

Figure 4:
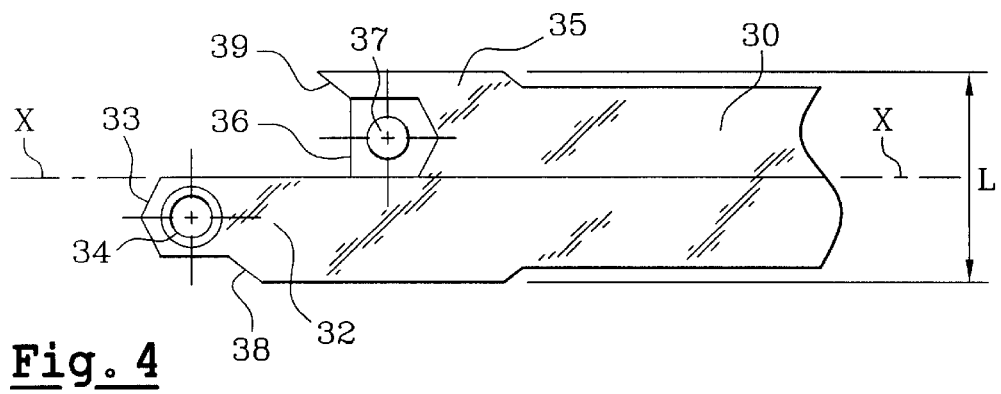
FIG. 4 is a plan view on a larger scale of an end of a joint according to the invention.
Figure 5:
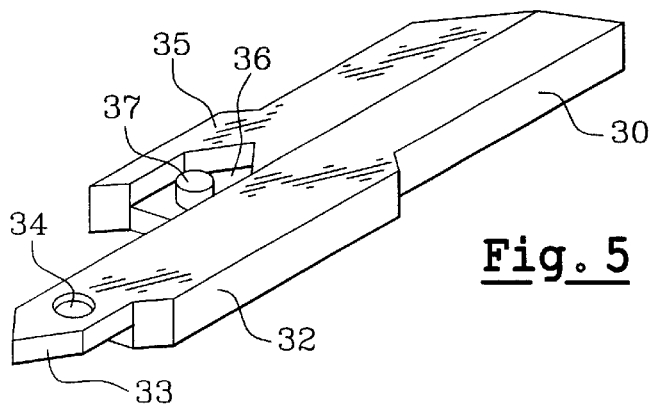
FIG. 5 is a view in perspective and on a larger scale of the end shown in FIG. 4.
Figure 6:
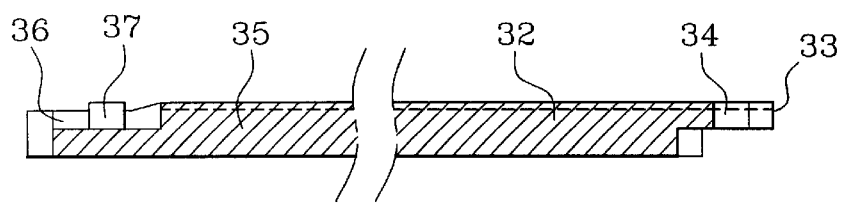
FIG. 6 is a view in section along line VI—VI of FIG. 2.
Figure 7:
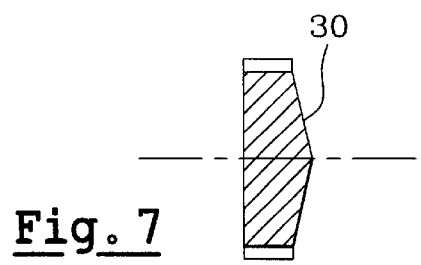
FIG. 7 is a view in section along line VII—VII of FIG. 2.

The joint shown in the drawing is, as visible in FIG. 7, thicker along the longitudinal axis XX than on the edges, its maximum thickness being greater than the depth of the groove formed in the disc, or in the cable passage of the connection box.

It is likewise wider in its end zones formed by the tongues 32 and 35 than in its median zone.

The width L of the end zones is equal to the width of the groove provided for positioning the circumferential joint 30.

By these arrangements, tightness is effected by the lower plane face of the joint bearing against the bottom of the groove and by the crushing of its axial part. As visible in FIG. 7, the upper face of the joint is constituted by two inclined planes joined along the longitudinal axis XX, which makes it possible to concentrate the effort of compression on the centre of the joint and to reduce the effort of closure of the envelope or of the connection box.

At the level of the joint ends attached to each other, the fact of providing a zone of width equal to the width of the groove makes it possible to tighten the zone of attachment between the bottom and the sides of the groove and the wall of the envelope (or of the cable). The two projecting tongues 32 are thus maintained in abutment against each other along the longitudinal axis XX. Similarly, the opposite inclined walls 38 and 39 are forced against each other, while the tips 33 are forced against the bottom of the recesses(36).

A tight closure of the joint is thus obtained by the creation of a multiplicity of baffles.

FIGS. 8a, 8b and 9a, 9b shows variant embodiments of the joint according to the invention.

FIGS. 8a and 8b show a joint of which the ends 50 and 51 present an assembly of concave and convex cut-outs. The cut-outs are made symmetrically so as to be able to be positioned in one another when the joint is closed.

Each of the ends 60 and 61 of the joint shown in FIGS. 10a and 10b presents recesses turned towards the upper face or towards the lower face of the joint. The recesses 65 and 66 turned towards the lower face of the joint are formed in projecting tongues. The recesses 62 and 63, turned towards the upper face of the joint, bear studs 67 while the wall of the recesses 65 and 66 turned towards the lower face of the joint is traversed by an orifice 68.

In the embodiment shown in the drawing, the recesses are substantially in the form of a triangle.

The recesses of each end are symmetrical to one another with respect to a point located on the longitudinal axis of the joint.

What is claimed is:

1. A joint wherein
longitudinal ends of said joint, along a longitudinal axis of the joint, include fittable means for removably fitting the longitudinal ends to one another in order to be mutually attached or detached, the joint having upper and lower faces,
the fittable means comprises, at each longitudinal end of the joint, a projecting tongue and a short tongue located side by side and on either side of the longitudinal axis, the projecting tongue being longer, longitudinally, than the short tongue,
the projecting tongue, and consequently the short tongue, of the longitudinal ends of the joint are arranged on the sides of the longitudinal axis so that the projecting tongue of one of the ends fits with the short tongue of another of the ends, and
the projecting and the short tongues bear means facing at least one of the upper the and lower faces for allowing attachment and detachment thereof when the upper and the lower faces are moved relatively toward each other in a direction perpendicular to the longitudinal axis of the joint.

2. Joint according to claim 1, characterized in that the projecting tongue terminates in a tip less wide and less thick than said projecting tongue.

3. Joint according to claim 2, characterized in that the tip is traversed by an orifice.

4. Joint according to claim 2, characterized in that the tip is disposed in line with the upper face of the joint.

5. Joint according to claim 2, characterized in that said short tongue at each longitudinal presents a recess and has corresponding as the tip.

6. Joint according to claim 5, characterized in that a stud with the same diameter as the orifice of the tip is formed in the recess of each longitudinal end.

7. Joint according to claim 5, characterized in that the tip and the recess are respectively connected to lateral edges of the joint by inclined faces.

8. Joint according to claim 1, wherein the means for attachment and detachment comprises recesses opening towards the upper face or towards the lower face of the joint.

9. Joint according to claim 8, characterized in that the recesses are formed in the projecting tongues.

10. Joint according to claim 8, characterized in that the recesses bear studs while a wall of the recesses at the lower face of the joint is traversed by an orifice.

11. A joint for a cylindrical element, the joint comprising:
- inner and outer faces, opposite longitudinal ends, and a longitudinal axis extending between the longitudinal ends;
- a pair of surfaces extending from the inner face inclining upwardly and meeting at the longitudinal axis;
- fittable means at the longitudinal ends for removably fitting the longitudinal ends to one another in order to be mutually attached or detached, the fittable means comprising, at each of the longitudinal ends, a projecting tongue and a short tongue located side by side and on either side of the longitudinal axis, the projecting tongue being longer, longitudinally, than the short tongue, the projecting tongue, and consequently the short tongue, of the longitudinal ends are arranged on the sides of the longitudinal axis so that the projecting tongue of one of the ends fits with the short tongue of another of the end,
- wherein, the projecting and the short tongues bear means for allowing attachment and detachment thereof.

12. A joint for wrapping around a cylindrical element, wherein
- longitudinal ends of said joint, along a longitudinal axis of the joint, include fittable means for removably fitting the longitudinal ends to one another in order to be mutually attached or detached,
- the fittable means comprises, at each longitudinal end of the joint, a projecting tongue and a short tongue located side by side and on either side of the longitudinal axis, the projecting tongue being longer, longitudinally, than the short tongue,
- the projecting tongue, and consequently the short tongue, of the longitudinal ends of the joint are arranged on the sides of the longitudinal axis so that the projecting tongue of one of the ends fits with the short tongue of another of the ends, and
- the projecting and the short tongues bear means for allowing radial attachment and detachment thereof when the joint is wrapped around the circumference of the cylindrical element.

\* \* \* \* \*